US010698884B2

(12) United States Patent
Raman et al.

(10) Patent No.: US 10,698,884 B2
(45) Date of Patent: Jun. 30, 2020

(54) DYNAMIC LINEAGE VALIDATION SYSTEM (71) Applicant: Bank of America Corporation, Charlotte, NC (US)

(72) Inventors: Sundar Rajan Raman, Tamil Nadu (IN); Jeff L. Howard, Charlotte, NC (US); Prasad L.v.k.d. Dasari, Charlotte, NC (US); Lakshmikanth S. Nagapudi, Waxhaw, NC (US); Padmanabham Ponnada, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 284 days.

(21) Appl. No.: 15/804,405

(22) Filed: Nov. 6, 2017

(65) Prior Publication Data

US 2019/0138627 A1    May 9, 2019

(51) Int. Cl.
    *G06F 16/23*    (2019.01)
    *G06F 9/445*    (2018.01)
    *G06F 16/25*    (2019.01)
    *G06F 8/36*     (2018.01)

(52) U.S. Cl.
    CPC .......... *G06F 16/2365* (2019.01); *G06F 8/36* (2013.01); *G06F 9/44521* (2013.01); *G06F 16/258* (2019.01)

(58) Field of Classification Search
    CPC .. G06F 16/2445; G06F 16/289; G06F 16/217; G06F 16/10; G96F 16/284
    See application file for complete search history.

(56) References Cited

U.S. PATENT DOCUMENTS

| 7,647,298 | B2* | 1/2010 | Adya | ................ | G06F 16/2445 |
| | | | | | 707/999.002 |
| 7,680,767 | B2* | 3/2010 | Adya | ................ | G06F 16/24539 |
| | | | | | 707/999.002 |
| 7,890,543 | B2* | 2/2011 | Hunt | ................ | G06F 9/4492 |
| | | | | | 707/803 |
| 7,895,241 | B2* | 2/2011 | Schoen | ................ | G06F 16/20 |
| | | | | | 707/802 |
| 8,176,475 | B2* | 5/2012 | Kosche | ................ | G06F 11/3447 |
| | | | | | 717/127 |
| 8,290,960 | B2  | 10/2012 | Li et al. | | |
| 8,595,042 | B2* | 11/2013 | Adler | ................ | G06Q 10/06 |
| | | | | | 705/7.11 |

(Continued)

*Primary Examiner* — Daniel A Kuddus
(74) *Attorney, Agent, or Firm* — Banner & Witcoff, Ltd.; Michael A. Springs (57) ABSTRACT Systems for providing dynamic lineage validation are provided. A system may receive mapping data from a computing device. The mapping data may be formatted used to generate one or more libraries. In some examples, the libraries may be stored and used in development of future processes. In some examples, one or more controls related to the process, mapping data, and the like, may be received. The system may execute the controls to determine whether data violates the one or more of the controls. If so, the system may prevent the associated process from executing. If the data does not violate one or more controls, the system may cause the process to execute. After executing the process, run time events may be collected. The run time events may be linked to the mapping data and may be used to validate data quality, data lineage, data accuracy, and the like.

15 Claims, 9 Drawing Sheets (56) References Cited

U.S. PATENT DOCUMENTS

| | | | |
|---|---|---|---|
| 9,330,119 B2* | 5/2016 | Chan | G06F 11/0751 |
| 2005/0060313 A1 | 3/2005 | Naimat et al. | |
| 2006/0294151 A1 | 12/2006 | Wong et al. | |
| 2007/0226203 A1* | 9/2007 | Adya | G06F 16/2445 |
| 2008/0235280 A1* | 9/2008 | Schoen | G06F 16/20 |
| 2010/0114628 A1* | 5/2010 | Adler | G06Q 10/063 |
| | | | 705/7.11 |
| 2011/0066602 A1 | 3/2011 | Studer et al. | |
| 2013/0080197 A1 | 3/2013 | Kung et al. | |
| 2014/0114907 A1 | 4/2014 | Kozina et al. | |
| 2014/0344310 A1* | 11/2014 | Seetharaman | G06F 8/35 |
| | | | 707/803 |
| 2014/0344778 A1* | 11/2014 | Lau | G06F 8/35 |
| | | | 717/106 |
| 2015/0347542 A1* | 12/2015 | Sullivan | G06F 16/254 |
| | | | 707/602 |
| 2018/0253669 A1* | 9/2018 | Thunoli | G06Q 10/067 |

* cited by examiner

DYNAMIC LINEAGE VALIDATION SYSTEM

BACKGROUND

Aspects of the disclosure relate to electrical computers, systems, and other devices. In particular, one or more aspects of the disclosure relate to provide dynamic lineage validation processes and efficiently generated processes for execution.

Design and execution of computer processes, such as applications, and the like, can be critical to functioning of a business. However, in conventional systems, design of one or more processes can be time consuming and inefficient. In particular, may systems require users to create or generate a process from a most basic starting point, even when tasks that are commonly used in processes have been previously generated.

Further, conventional systems for generating and executing processes do not have robust validation or tracking capabilities. For instance, inquiries regarding validity of data, accuracy of data, lineage of data, versions of processes, mapping documents, and the like, are not readily accessible in conventional systems. Accordingly, requests for this information can be time consuming and detract from other work being performed. Accordingly, systems to efficiently generate and execute work processes, provide validation of mapping and other data, and provide ease of access to lineage, mapping, runtime and other data, may be advantageous.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with designing and executing a process, generating reusable components or libraries, and efficiently determining and presenting information related to accuracy of data and validity of data based on collected run time data.

In some examples, a system, computing platform, or the like, may receive mapping data, for instance, via a mapping document. In some arrangements, the mapping data may be received from a computing device. The mapping data may be formatted and the formatted data may be used to generate and/or drive one or more libraries or components. In some examples, the libraries or components may be stored and used in development of future processes as pre-generated modules.

In some examples, one or more controls and/or rules related to the process, mapping data, and the like, may be received. The system, computing platform, or the like, may evaluate or execute the rules to determine whether data violates the one or more of the controls and/or rules. If so, the system, computing platform, or the like, may prevent the associated process from executing.

If the data does not violate one or more rules and/or controls, the system, computing platform, or the like, may cause the process to execute. After executing the process, run time events may be collected and transmitted to the system, computing platform, or the like. The run time events may be linked to the mapping data and may be used to validate data quality, data lineage, data accuracy, and the like.

In some examples, one or more interactive user interfaces or dashboards may be generated. The interactive user interfaces or dashboards may provide access to mapping data, run time events, lineage information, and the like, and may be used to illustrate data quality, accuracy, and the like.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to providing lineage validation functions as well as generating process components that may be stored and re-used to generate other processes for execution.

For many entities, particularly those involved with regulatory bodies, providing transparency and illustrating data quality and accuracy are paramount. Many conventional systems require requests to specific users to access specific systems to retrieve specific information in order to provide this transparency, validate data, illustrate lineage, illustrate accuracy of data, and the like. These arrangements are inefficient and can be prone to error. In addition, they require resources that might not be available at a desired time and/or may be better allocated to other functions.

Accordingly, systems for providing transparency, data accuracy, lineage information, and the like, without requiring the inefficiencies of conventional systems may be advantageous.

Aspects described herein relate to systems, computing platforms, methods, computer-readable media, and the like, for performing lineage validation functions. The arrangements described herein include receiving mapping data (e.g., from a mapping document) which may then be used to build a process. For instance, mapping data may be formatted, for instance, using a data interchange standard, and the formatted data may then be used to generate one or more libraries or components that may be reused in future process development.

In some examples, one or more controls and/or rules may be received. The controls and/or rules may be executed to determine whether data associated with a process violates any of the controls and/or rules. If so, the system may prevent execution of the process. If no controls or rules are violated, the process may be executed. After executing the process, run time data may be collected. The run time data may include run time events that may be linked to the received mapping data. Accordingly, design data (e.g., mapping data, and the like) may be linked to run time data and the linked data may be used to provide data lineage information, illustrate data quality and/or accuracy, and the like.

In some examples, the system may generate one or more interactive dashboards or user interfaces. The interactive user interfaces may enable efficient collection of data (e.g., mapping data, run time events, and the like) and may enable efficient illustration of data (e.g., data quality, lineage validation, data accuracy, and the like). These interactive user interfaces and dashboards may be customized or manipulated to provide desired information.

These and various other arrangements will be discussed more fully below.

Figure 1A:
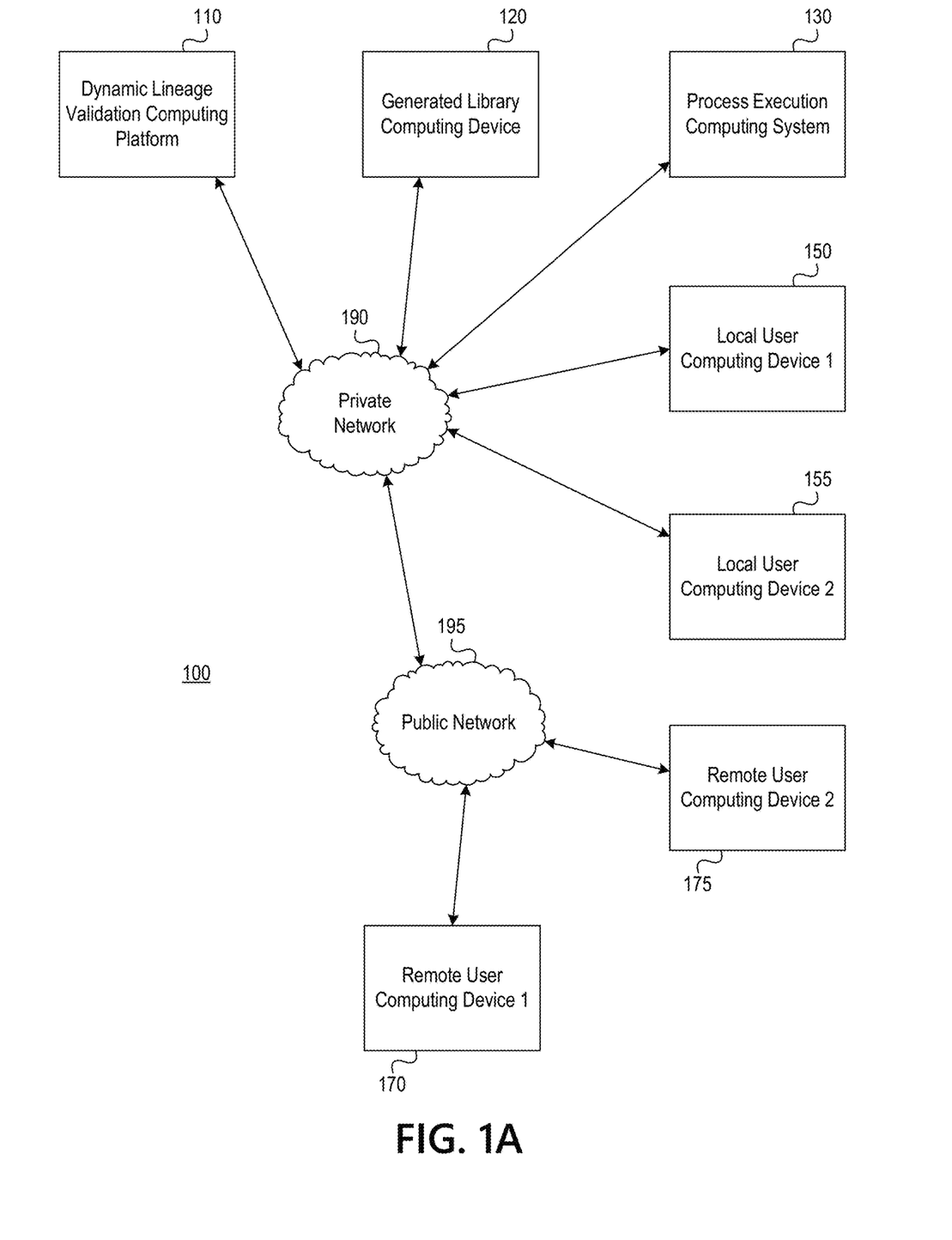
FIGS. 1A and 1B depict an illustrative computing environment for implementing dynamic lineage validation functions in accordance with one or more aspects described herein.
Figure 1B:
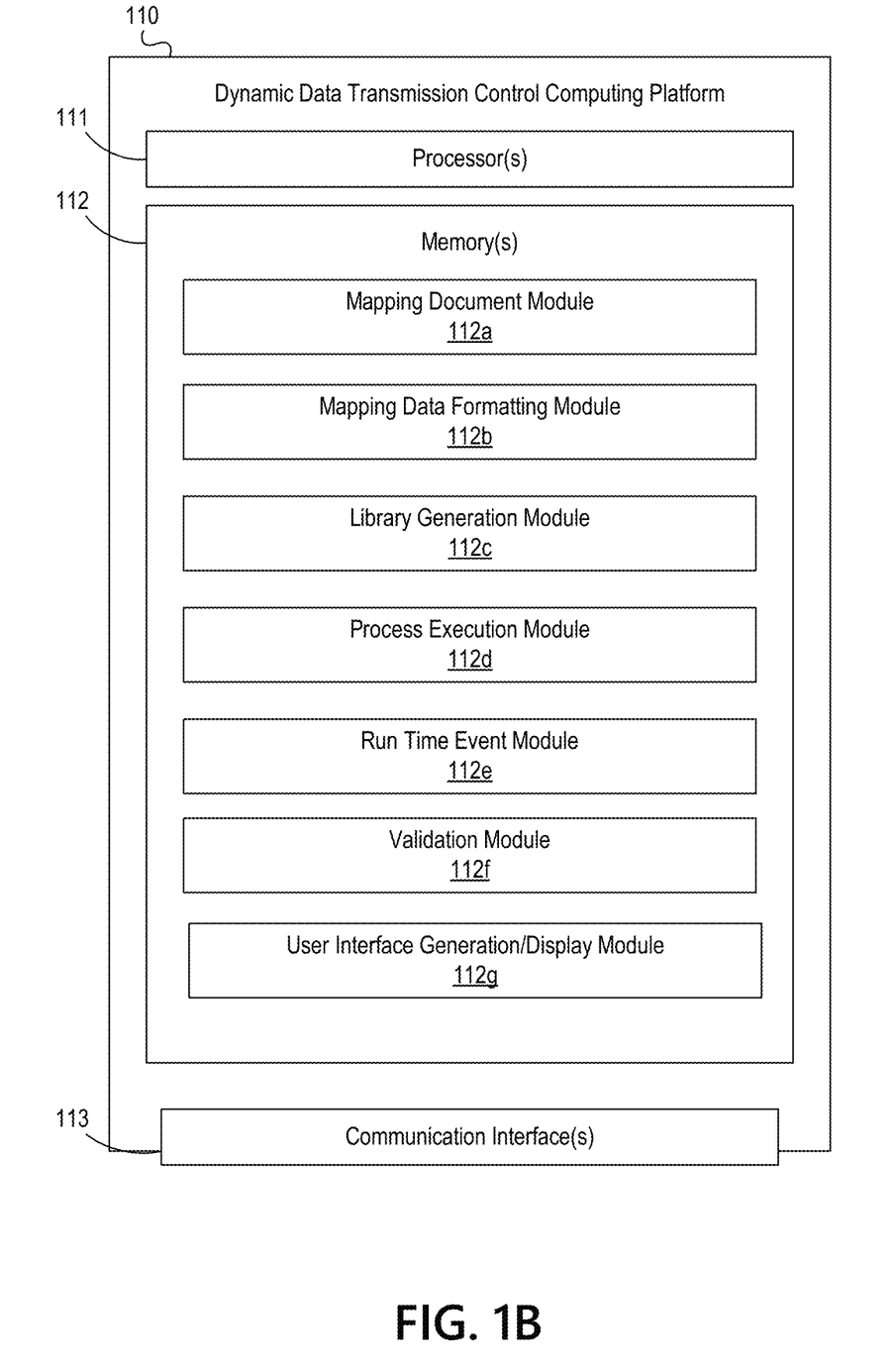

FIGS. 1A and 1B depict an illustrative computing environment for implementing and using a dynamic data lineage validation computing system in accordance with one or more aspects described herein. Referring to FIG. 1A, computing environment 100 may include one or more computing devices and/or other computing systems. For example, computing environment 100 may include a dynamic lineage validation computing platform 110, a generated library computing device 120, a process execution computing system 130, a first local user computing device 150, a second local user computing device 155, a first remote user computing device 170, and a second remote user computing device 175.

Dynamic lineage validation computing platform 110 may be configured to provide dynamic data lineage validation control functions. In some examples, mapping data may be received (e.g., from a user computing device such as local user computing device 150, local user computing device 155, remote user computing device 170, remote user computing device 175, or the like) or other computing device. The mapping data may include source locations and target locations for data. This mapping data may include lineage of the data. The mapping data may be formatted (e.g., using a data interchange standard) and may be used to drive or generate one or more libraries or components. The generated libraries may be stored in a computing device, such as generated library computing device 120, in a database, or the like. The generated libraries may be later used to generate one or more processes (e.g., an application, or the like) for execution.

The dynamic lineage validation computing platform 110 may further execute or generate an instruction to execute a process (e.g., an application developed, or the like). The process may be executed by the dynamic lineage validation computing platform 110, by process execution computing system 130, or by another computing device. After executing the process, runtime events may be collected. The dynamic lineage validation computing platform 110 may then link and/or compare the runtime events to the mapping data to validate the mapping data, execution of the process, and the like. Accordingly, data lineage may be captured, stored, and validated by the system to ensure accuracy of data, and the like.

Generated library computing device 120 may be any type of computing device performing various library storage, manipulation, and the like, functions, for example, within an entity. For instance, the generated library computing device 120 may store one or more generated libraries which may be accessed via a computing device (e.g., local user computing device 150, local user computing device 155, remote user computing device 170, remote user computing device 175, or the like) to generate or develop one or more processes. The libraries may be selected and used as pre-generated modules for data preparation, sourcing, controls, and the like, when developing a process.

Process execution computing system 130 may be any time of computer system performing various process execution function, for example, within an entity. For examples, a process may be executed in order to generate runtime data or events for use in validation. In some arrangements, the dynamic lineage validation computing platform 110 may generate an instruction or command to execute a process and may transmit the instruction or command to the process execution computing system 130. The process execution computing system 130 may receive the instruction or command and execute the instruction or command to execute the selected process.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. The local and remote user computing devices may be used to communicate with, for example, dynamic lineage validation computing platform 110, receive mapping data, select libraries for generating processes for execution, display one or more user interfaces, and the like.

In one or more arrangements, generated library computing device 120, process execution computing system 130, local user computing device 150, local user computing device 155, remote user computing device 170, and/or remote user computing device 175 may be any type of computing device or combination of devices capable of performing the particular functions described herein. For example, generated library computing device 120, process execution computing system 130, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of generated library computing device 120, process execution computing system 130, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include dynamic lineage validation computing platform 110. As illustrated in greater detail below, dynamic lineage validation computing platform 110 may include one or more computing devices configured to perform one or more of the functions described herein. For example, dynamic lineage validation computing platform 110 may include one or more computers (e.g., laptop computers, desktop computers, servers, server blades, or the like).

As mentioned above, computing environment 100 also may include one or more networks, which may interconnect one or more of dynamic lineage validation computing platform 110, generated library computing device 120, process execution computing system 130, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic lineage validation computing platform 110, generated library computing device 120, process execution computing system 130, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect dynamic lineage validation computing platform 110, generated library computing device 120, process execution computing system 130, local user computing device 150, and local user computing device 155, and one or more other computing devices and/or computer systems that are used by, operated by, and/or otherwise associated with the organization. Public network 195 may connect private network 190 and/or one or more computing devices connected thereto (e.g., dynamic lineage validation computing platform 110, generated library computing device 120, process execution computing system 130, local user computing device 150, local user computing device 155) with one or more networks and/or computing devices that are not associated with the organization. For example remote user computing device 170, and/or remote user computing device 175 might not be associated with an organization that operates private network 190 (e.g., because remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect remote user computing device 170 and remote user computing device 175 to private network 190 and/or one or more computing devices connected thereto (e.g., dynamic lineage validation computing platform 110, generated library computing device 120, process execution computing system 130, local user computing device 150, local user computing device 155).

Referring to FIG. 1B, dynamic lineage validation computing platform 110 may include one or more processors 111, memory 112, and communication interface 113. A data bus may interconnect processor(s) 111, memory 112, and communication interface 113. Communication interface 113 may be a network interface configured to support communication between dynamic lineage validation computing platform 110 and one or more networks (e.g., private network 190, public network 195, or the like). Memory 112 may include one or more program modules having instructions that when executed by processor(s) 111 cause dynamic lineage validation computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic lineage validation computing platform 110 and/or by different computing devices that may form and/or otherwise make up dynamic lineage validation computing platform 110.

For example, memory 112 may have, store, and/or include a mapping document module 112*a*. Mapping document module 112*a* may store instructions and/or data that may cause or enable the dynamic lineage validation computing platform 110 to receive mapping data from one or more computing devices, such as local user computing device 150, local user computing device 155, remote user computing device 170, remote user computing device 175, or the like. The mapping data may include data lineage information, data movement information, operations associated with the data, and the like. This data may be used to generate one or more libraries or components, as will be discussed more fully herein. In some examples, mapping document module 112*a* may also receive one or more data controls, rules, or the like, that may be used in executing one or more processes.

Dynamic lineage validation computing platform 110 may further have, store and/or include a mapping data formatting module 112*b*. Mapping data formatting module 112*b* may store instructions and/or data that may cause or enable the dynamic lineage validation computing platform 110 to format the received mapping data in order to generate one or more libraries. For instance, the mapping data may be formatting using a data interchange standard.

The formatted mapping data may then be used to generate one or more libraries or components by library generation module 112*c*. Library generation module 112*c* may store instructions and/or data that may cause or enable the dynamic lineage validation computing platform 110 to generate one or more libraries or components. The generated libraries or components may be transmitted to, for instance, generated library computing device 120, for use by one or more developers or the like to generate processes using the libraries as pre-generated modules, Dynamic lineage validation computing platform 110 may further have, store and/or include a process execution module 112*d*. Process execution module 112*d* may store instructions and/or data that may cause or enable the dynamic lineage validation computing platform 110 to generate an instruction, signal or command to execute one or more processes. In some examples, the one or more processes may be processes executing aspects associated with the mapping data received. In some arrangements, the instruction, signal or command may be transmitted to a computing system, such as process execution computing system 130, and may be executed by the system to execute the one or more processes.

Dynamic lineage validation computing platform 110 may further have, store and/or include a run time event module 112*e*. The run time event module 112*e* may store instruction and/or data that may cause or enable the dynamic lineage validation computing platform 110 to receive or collect run time data, including run time events, from the executed process. The run time events may be stored, for instance, in a database, and may be used in one or more validation processes.

Dynamic lineage validation computing platform 110 may further have, store and/or include a validation module 112*f*. Validation module 112*f* may store instructions and/or data that may cause or enable the dynamic lineage validation computing platform 110 to link and/or compare run time events to mapping data to validate expected results from the mapping data, execution of the process, and the like. In some examples, the validation module 112*f* may store the linked run time events, mapping data, and the like. Accordingly, upon receiving a request (e.g., from local user computing device 150, local user computing device 155, remote user computing device 170, remote user computing device 175, or the like) the validation data may be provided. Accordingly, a request for validation data (e.g., for presentation to one or more regulatory agencies or the like) may be provided efficiently and without requiring additional processes to generate the requested data, compare the data, or the like.

Dynamic lineage validation computing platform 110 may further have, store and/or include a user interface generation/display module 112*g*. User interface generation/display module 112*g* may store instructions and/or data that may cause or enable the dynamic lineage validation computing platform 110 to generate one or more interactive user interfaces or dashboards, transmit the generated user interfaces or dashboards to a device (e.g., local user computing device 150, local user computing device 155, remote user computing device 170, remote user computing device 175, or the like), and/or may cause the generated interface or dashboard to display on a display of the device. In some examples, the generated interfaces or dashboards may display lineage of data, data sources, data target locations, processes performed on the data, expected results, actual results (e.g., from run time events), and the like. Accordingly, data quality, accuracy and the like, can be quickly evaluated.

In some examples, the generated user interface or dashboard may include an indication of one or more controls received by the system. In some examples, if the data does not meet predefined conditions associated with the goals, execution of one or more processes may be prevented. Accordingly, a generated user interface or dashboard may include controls data, outcome of controls evaluations, and the like.

FIGS. 2A-2D depict an illustrative event sequence for implementing and using dynamic lineage validation functions in accordance with one or more aspects described herein. The events shown in the illustrative event sequence are merely one example sequence and additional events may be added, or events may be omitted, without departing from the invention.

Figure 2A:
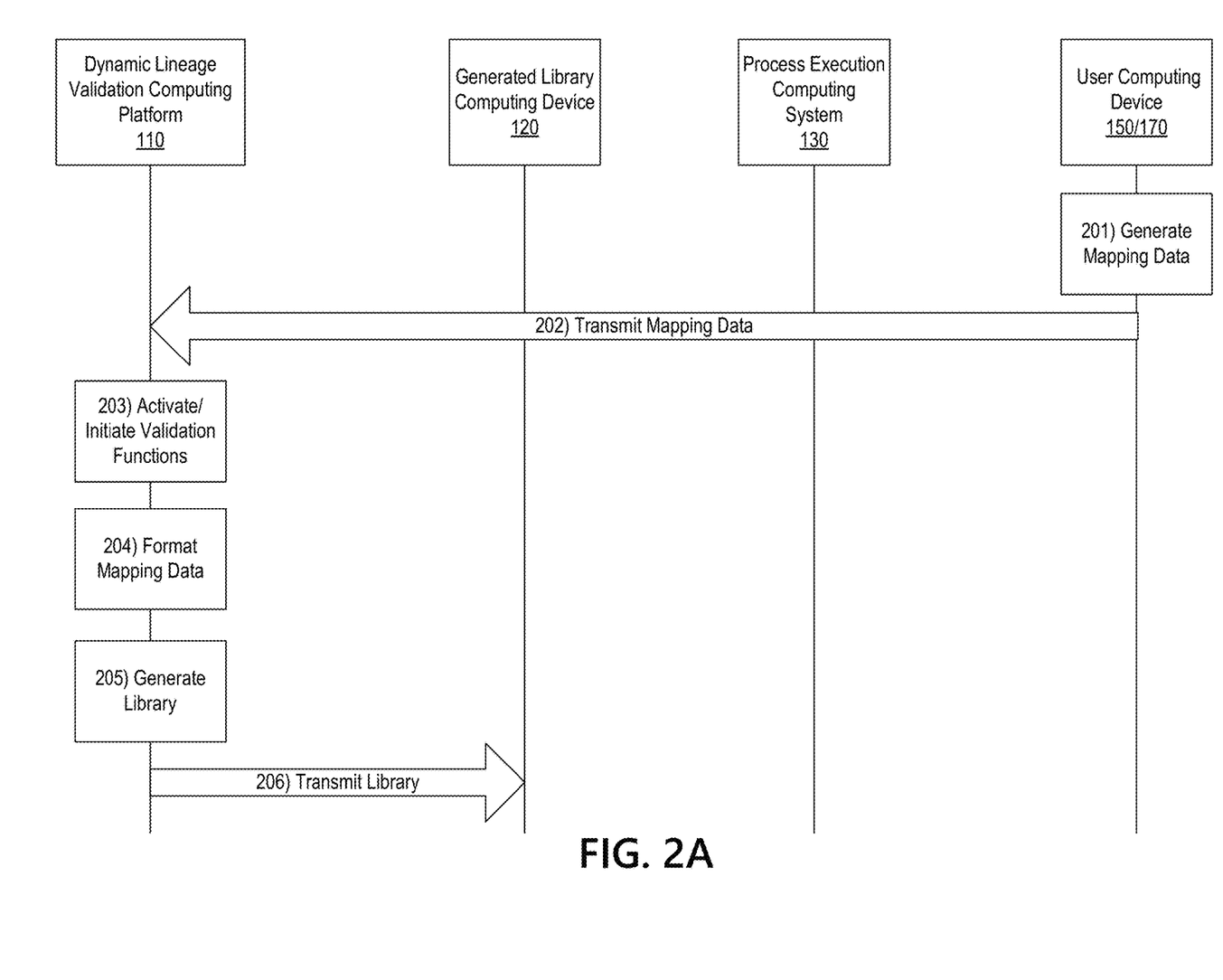
FIGS. 2A-2D depict an illustrative event sequence for implementing dynamic lineage validation functions in accordance with one or more aspects described herein.

Referring to FIG. 2A, at step 201, mapping data may be generated. In some examples, the mapping data may be generated by, for example, local user computing device 150, remote user computing device 170, or the like. In some arrangements, the mapping data may be imported by the local user computing device 150, remote user computing device 170, or the like. In some examples, mapping data may be received via a mapping document that may be in one of various different formats without departing from the invention.

The mapping data may include data source information, data target information, operations performed on the data, and the like.

In step 202, the mapping data may be transmitted from the computing device (e.g., local user computing device 150, remote user computing device 170, or the like) to the dynamic lineage validation computing platform 110. In step 203, the mapping data may be received by the dynamic lineage validation computing platform 110. Receipt of the mapping data may cause the dynamic lineage validation computing platform 110 to initiate or activate validation functions. For instance, upon receiving mapping data, the dynamic lineage validation computing platform 110 may initiate, activate, or enable one or more functions of the dynamic lineage validation computing platform 110, such as mapping data formatting functions, process execution functions, library generation functions, validation functions, and the like. In some examples, activating, initiating, or enabling one or more functions may include providing a function that was not previously available or enabled (e.g., before activation, initiation, or enabling).

In step 204, the received mapping data may be formatted. For instance, the received mapping data may be formatting using a data interchange standard. In some examples, formatting the data may result in a formatted dataset which may be used to generate one or more libraries in step 205. For instance, the formatted data may be used to generate one or more libraries or components that may be used in future development in, for instance, a modular fashion. Accordingly, a developer may extract one or more pre-generated libraries and may use the library to efficiently generate a new process for execution, development, or the like, without recreating the code stored in the library. This may aid in conserving computing resources by reducing the time required to generate new process, or the like, in development or design stages.

In step 206, the generated library may be transmitted to, for instance, data storage, such as a generated library computing device 120. The generated library computing device 120 may be a computing device specifically configured to perform one or more functions described herein. For instance, the generated library computing device may be configured to store one or more generated libraries or components, to provide access to the stored one or more libraries or components, to enable searching and selection of a desired library or component, and the like.

Figure 2B:
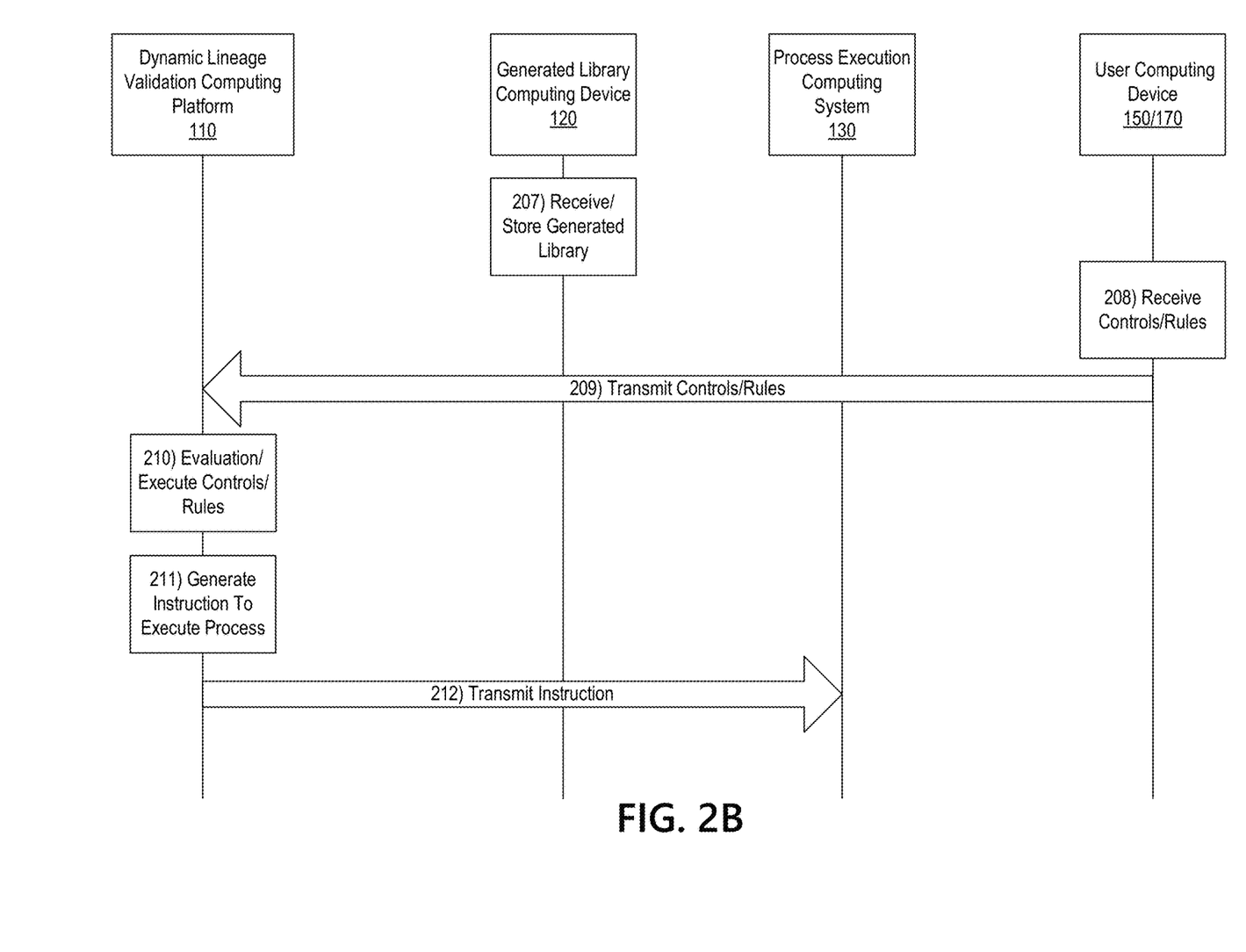

With reference to FIG. 2B, in step 207, the generated library may be received by the generated library computing device 120 and may be stored by the generated library computing device 120 for later use.

In step 208, one or more controls and/or rules may be received. For instance, in generating a process for execution, one or more controls or rules for the data may be received, e.g., from local user computing device 150, remote user computing device 170, or the like. In some examples, one or more controls or rules may include predefined thresholds or limits for a value of one or more data elements. In some examples, the predefined threshold or limit may include a predefined or predetermined acceptable range in which a value of a data element should fall. If the value of the data element is outside the range, the rule may be violated.

In step 209, the controls and/or rules may be transmitted from the computing device (e.g., local user computing device 150, remote user computing device 170) to the dynamic lineage validation computing platform 110. In step 210, the one or more controls and/or rules may be evaluated or executed to determine whether data violates any of the controls and/or rules. If so, the dynamic lineage validation computing platform 110 may prevent a process associated with the data from executing. For instance, the dynamic lineage validation computing platform 110 may generate an instruction or comment preventing a device from executing the associated process.

If the received rules and/or controls are not violated, in step 211, the dynamic lineage validation computing platform 110 may generate an instruction, signal or command to execute an associated process. In step 212, the generated instruction, signal or command may be transmitted to, for instance, a process execution computing system 130. In some arrangements, the process execution computing system 130 may be part of (e.g., in a same physical device) as the dynamic lineage validation computing platform 110. In other examples, the process execution computing system 130 may be a separate device.

Figure 2C:
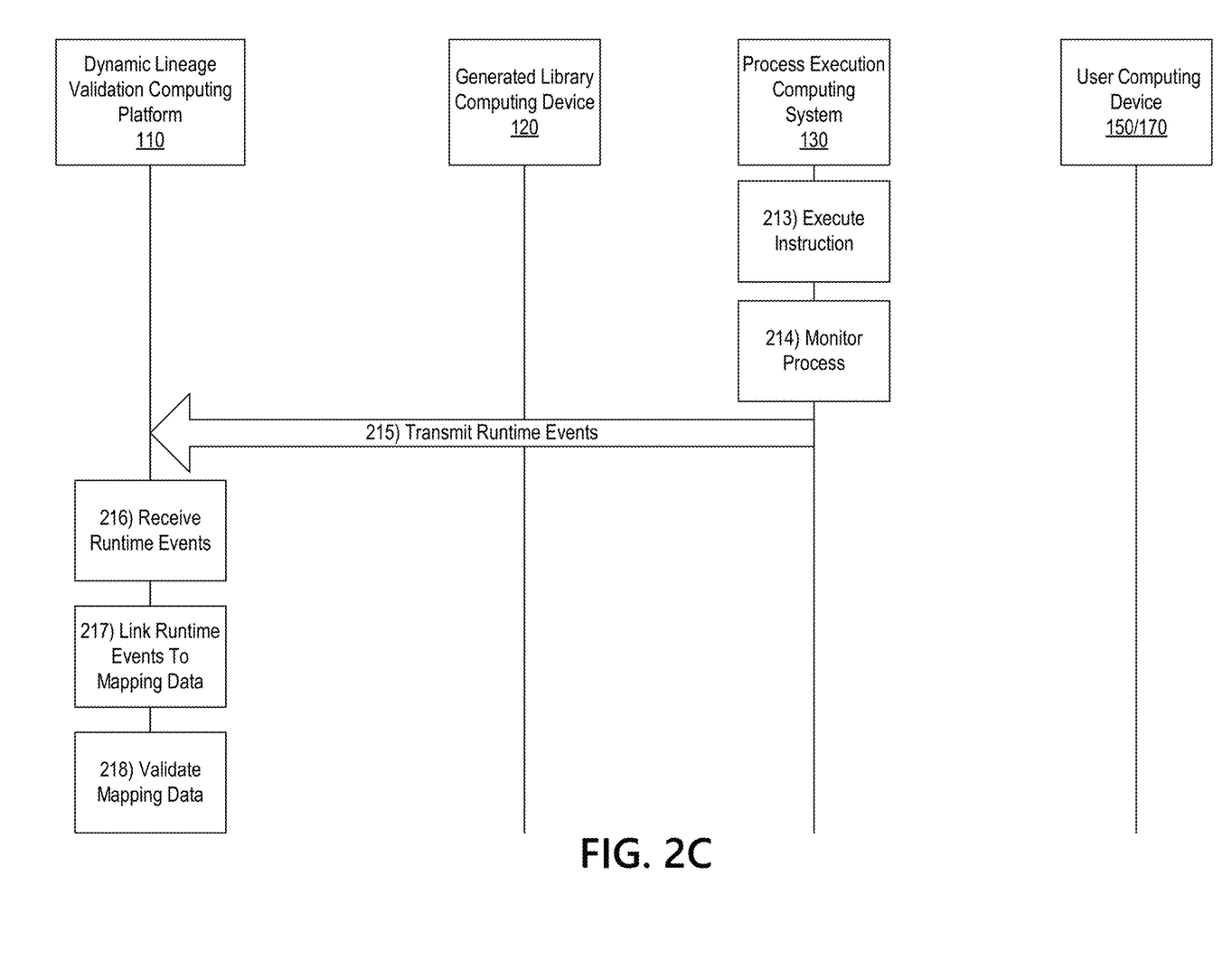

With reference to FIG. 2C, in step 213, the instruction, signal or command may be received by the process execution computing system 130 and may be executed by the system. Execution of the instruction may cause the process execution computing system 130 to execute the process.

In step 214, the executed process may be monitored and one or more run time events may be captured. In some examples, the run time events may log functions performed, one or more outcomes, data sources and locations, and the like. In step 215, the run time events may be transmitted to the dynamic lineage validation computing platform 110.

In step 216, the run time events may be received by the dynamic lineage validation computing platform 110. In step 217, the run time events may be linked to the mapping data by the dynamic lineage validation computing platform 110. Linking the run time events to the mapping data may be performed in a variety of ways. For instance, in some examples, version information of the process (e.g., of an application) may be embedded into the code associated with the process (e.g., in the formatted mapping data). Accordingly, when a process is executed, the version information may be output with the run time events. This will then tie the run time events captured to the version embedded in the formatted mapping data.

In another example, the source code may be enriched with unique names for various steps of the process. When the process is executed, run time events may be generated and collected and the name of the step executed may be stored with the step and output when the step is executed. In some examples, the unique name may also be associated with design information, such as testing documents, requirements, controls, rules, and the like) and, thus, the run time event output with the unique name can then be linked to the design information (e.g., mapping data).

In still another example, mapping data and/or mapping documents may be enriched to include version and release information. In some examples, links between run time events and mapping data may be tested. For instance, a system may pull data from run time information, as well as mapping data, and verify that the data is properly linked. This information may be recorded and may further record the link between the run time data and the mapping data.

In step 218, mapping data may be validated. For instance, the run time events may be compared to the mapping data to confirm that execution of the process produced results expected based on the mapping data. This validation process may be recorded and any issues identified may be flagged for further processing.

Figure 2D:
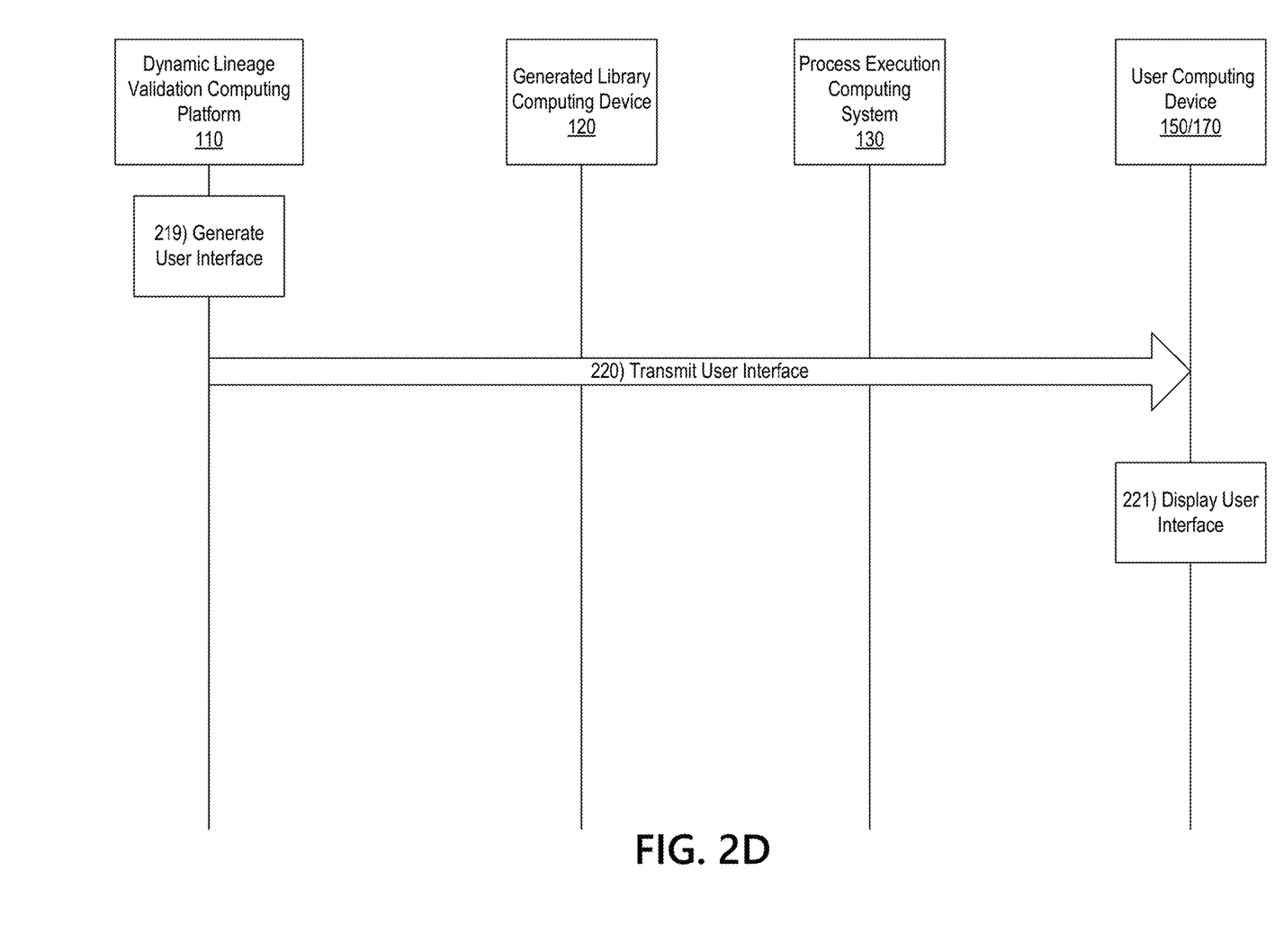

With reference to FIG. 2D, in step 219, one or more interactive user interfaces or dashboards may be generated. The user interfaces may include validation information, mapping data, run time events, and the like. In some examples, the user interface may include links between mapping data and run time events that may be used to illustrate accuracy of data, validate data lineage, and the like. For instance, one or more user interfaces may include links between data such as an application, version of the application and date information. For example, dates associated with an application developed for execution (e.g., when development started, when development ended, when quality processes started, production release dates, and the like) may be associated with and/or linked to an application name and/or version. Accordingly, selection of one of an application name, version, or date may cause the user interface to display the other two of application name, version, or date. In some examples, these links may be enabled using metadata (e.g., release data, date information, and the like) associated with the application.

In another example, links between an application, a version of the application, and lineage information may be established and provided via the user interface. In still another example, a link between an application, a version of an application, and mapping documents associated with the application may be established and provided via the user interface. In still another example, links between an application, version of an application, and test artifacts (e.g., test plans, issued identified during testing, and the like) may be established and provided via the user interface. In yet another example, links between an application, version of an application, and concern information from production may be established and provided via the user interface.

In some examples, one or more of the links describes above may be established by enriching data (e.g., mapping data, mapping documents, and the like) with metadata associated with an application, a release of an application or process, and the like.

Various other links may be established and provided via generated user interfaces and dashboards without departing from the invention.

In step 220, the generated user interfaces and/or dashboards may be transmitted to a computing device, such as local user computing device 150, remote user computing device 170, and the like. In step 221, the generated user interfaces and/or dashboards may be displayed on the computing device 150, 170. In some examples, the generated user interfaces and dashboards may be used to provide information about a process to various business units of an entity. In addition, the generated user interfaces and dashboards may be used to provide information to one or more regulatory agencies regarding data, data quality, accuracy of data, data processes, controls and/or rules applied, and the like.

Figure 3:
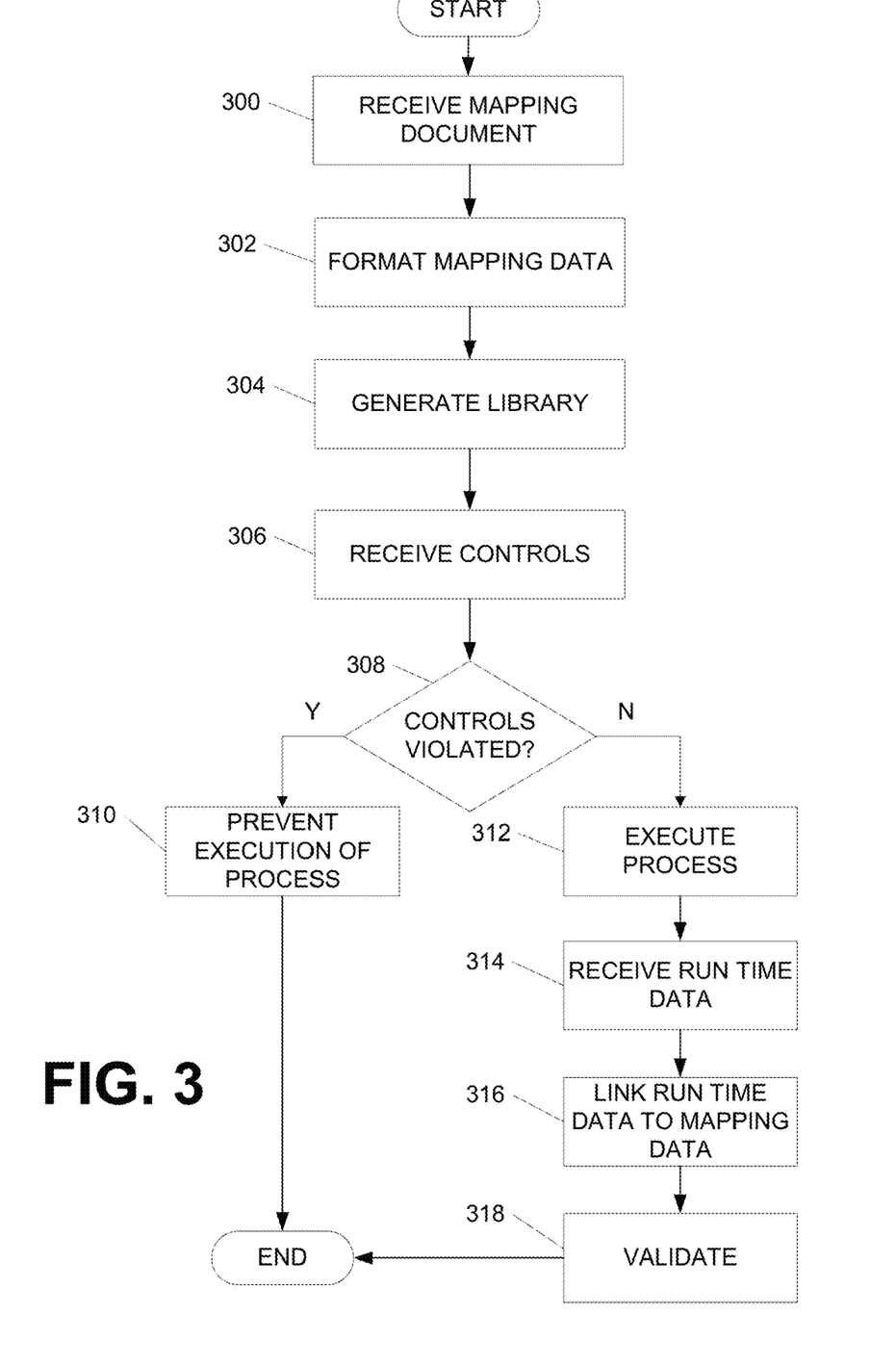
FIG. 3 depicts an illustrative method for implementing and using a system to perform dynamic lineage validation functions, according to one or more aspects described herein.

FIG. 3 is a flow chart illustrating one example method of implementing a dynamic lineage validation system according to one or more aspects described herein. The processes illustrated in FIG. 3 are merely some example processes and functions. The steps shown may be performed in a different order, more steps maybe added, or one or more steps may be omitted without departing from the invention.

In step 300, a mapping document may be generated. The mapping document may include mapping data associated with mapping one or more source locations to one or more target locations, and the like. The mapping data may also include data associated with one or more processes or transformations performed on the data. The mapping documents including the mapping data may then be transmitted to and/or received by, for instance, the dynamic lineage validation computing platform 110.

In step 302, the received mapping data may be formatted. As discussed herein, the mapping data may be formatted using a data interchange standard resulting in formatted data. In step 304, the formatted data may be used to drive or generate one or more libraries or components. The generated libraries or components may be stored and used for future development of processes, applications, and the like, as pre-generated, modules that may be used in conjunction with other libraries to efficiently generate processes (e.g., applications, and the like).

In step 306, one or more controls and/or rules may be received. In step 308, the controls or rules may be executed to determine whether any of the controls and/or rules are violated. If so, in step 310, the system (e.g., the dynamic lineage validation computing platform 110) may prevent execution of the associated process and the data may be flagged for further evaluation and/or processing. If, in step 308, the one or more controls and/or rules are not violated, in step 312, the process may be executed. Execution of the process may include generating an instruction, signal or command to execute the process and transmitting that instruction, signal or command to a process execution computing system 130 causing the process to execute.

In step 314, run time data associated with the process may be received. For instance, after executing the process, run time events associated with the process may be collected while the process is executing, after execution, or the like. In some examples, this data may be stored in a log.

In step 316, the run time data and/or events may be linked to the mapping data received. Accordingly, in step 318, the mapping data and/or run time events may be validated by comparing the linked run time events with the mapping data to determine whether a process is executing with expected results, to confirm data quality, verify data accuracy, and the like. As discussed above, this information may be displayed in one or more user interfaces or dashboards to provide requested data to a user (e.g., business user, regulatory auditor, or the like).

Accordingly, by storing the mapping data, lineage, and controls (e.g., design data) with the run time data associated with the executed process, the data to validate the mapping data, controls and the like may be easily stored and accessed. In addition, the arrangements described herein improve efficiency and speed to market for one or more products because code for the process being executed is generated from the mapping document. Accordingly, code can be reused and efficiently generated without writing new code for each process to be executed. In some examples, the mapping documents may be used to generate or drive one or more libraries. The data from the one or more libraries may then be used as a starting point for generating code for a new process. Accordingly, by reusing code previously generated from one or more mapping documents, the process may be more efficiently generated and/or may move more quickly from a design phase to a run or execution phase.

Further, as discussed above, the user interfaces and/or dashboards generated may provide efficient access to data and may be customized to provide desired information. For example, in some arrangements, a business unit may identify one or more types of data as a key business element. The key business element may then be flagged and may be displayed to users within the business unit. In addition, by flagging a key business element and providing access to that data element via a user interface or dashboard, the system can provide data having a business value in conjunction with lineage or other validation data. This may aid in improving efficiency of providing information, reduce the amount of data that may be presented by focusing on a key business element, or the like.

Aspects of the arrangements described herein provide an efficient, scalable, and convenient system for accurately capturing lineage information for data, generating libraries or components that may be used to generate processes for execution, validate quality and accuracy of data, and the like. The arrangements described aid in efficiently using computing resources by reusing generated source code (e.g., via libraries) and by linking run time events to mapping data in order to accurately and efficiently validate data, confirm results of an executed process are as expected, provide a visual indication of lineage, and the like.

Figure 4:
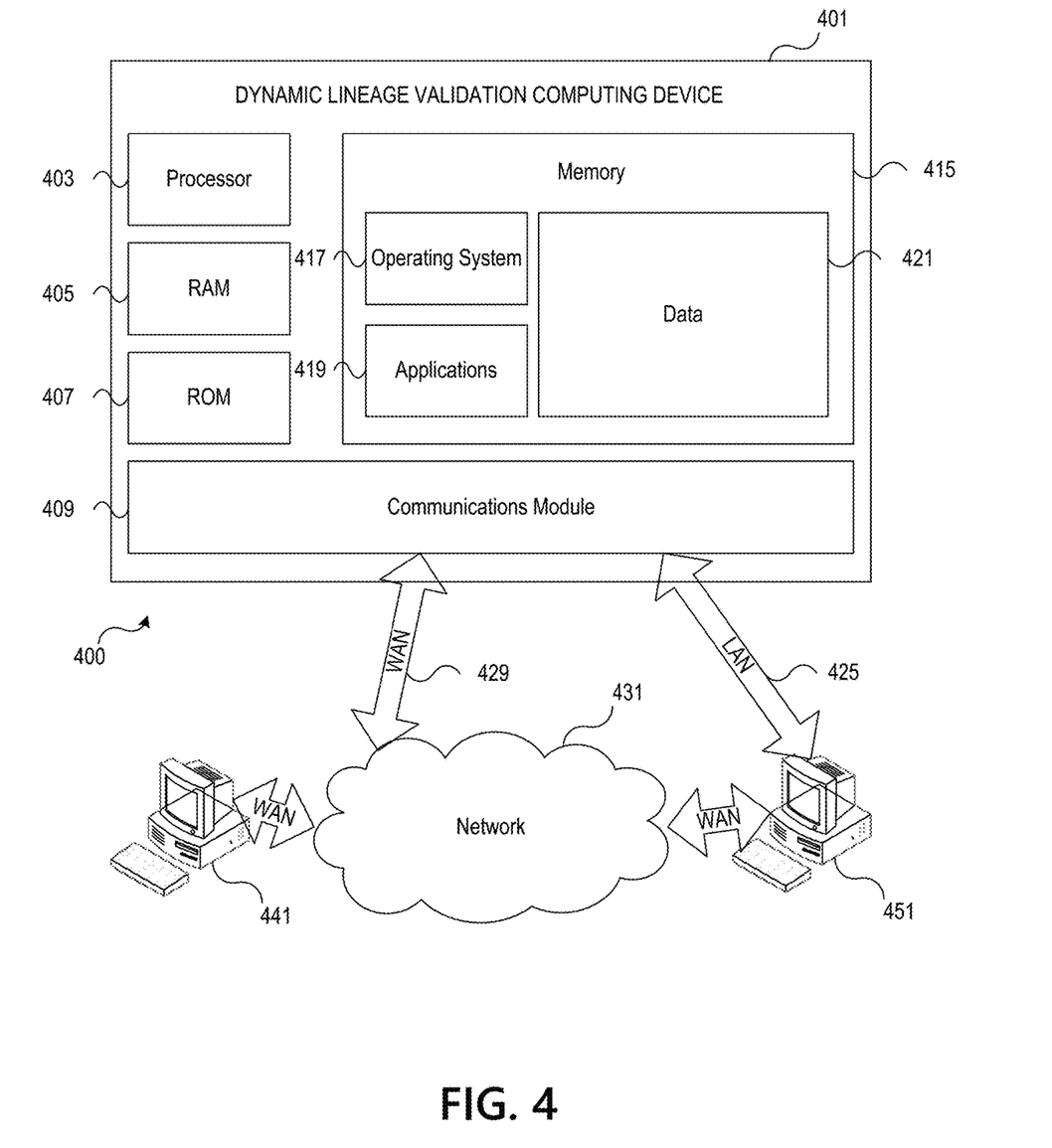
FIG. 4 illustrates one example operating environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include dynamic lineage validation computing device 401 having processor 403 for controlling overall operation of dynamic lineage validation computing device 401 and its associated components, including Random Access Memory (RAM) 405, Read-Only Memory (ROM) 407, communications module 409, and memory 415. Dynamic lineage validation computing device 401 may include a variety of computer readable media. Computer readable media may be any available media that may be accessed by dynamic lineage validation computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic lineage validation computing device 401. Such a processor may execute computer-executable instructions stored on a computer-readable medium.

Software may be stored within memory 415 and/or storage to provide instructions to processor 403 for enabling dynamic lineage validation computing device 401 to perform various functions. For example, memory 415 may store software used by dynamic lineage validation computing device 401, such as operating system 417, application programs 419, and associated database 421. Also, some or all of the computer executable instructions for dynamic d lineage validation computing device 401 may be embodied in hardware or firmware. Although not shown, RAM 405 may include one or more applications representing the application data stored in RAM 405 while dynamic lineage validation computing device 401 is on and corresponding software applications (e.g., software tasks) are running on dynamic lineage validation computing device 401.

Communications module 409 may include a microphone, keypad, touch screen, and/or stylus through which a user of dynamic lineage validation computing device 401 may provide input, and may also include one or more of a speaker for providing audio output and a video display device for providing textual, audiovisual and/or graphical output. Computing system environment 400 may also include optical scanners (not shown). Exemplary usages include scanning and converting paper documents, e.g., correspondence, receipts, and the like, to digital files.

Dynamic lineage validation computing device 401 may operate in a networked environment supporting connections to one or more remote computing devices, such as computing devices 441 and 451. Computing devices 441 and 451 may be personal computing devices or servers that include any or all of the elements described above relative to dynamic lineage validation computing device 401.

The network connections depicted in FIG. 4 may include Local Area Network (LAN) 425 and Wide Area Network (WAN) 429, as well as other networks. When used in a LAN networking environment, dynamic lineage validation computing device 401 may be connected to LAN 425 through a network interface or adapter in communications module 409. When used in a WAN networking environment, dynamic lineage validation computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like and are configured to perform the functions described herein.

Figure 5:
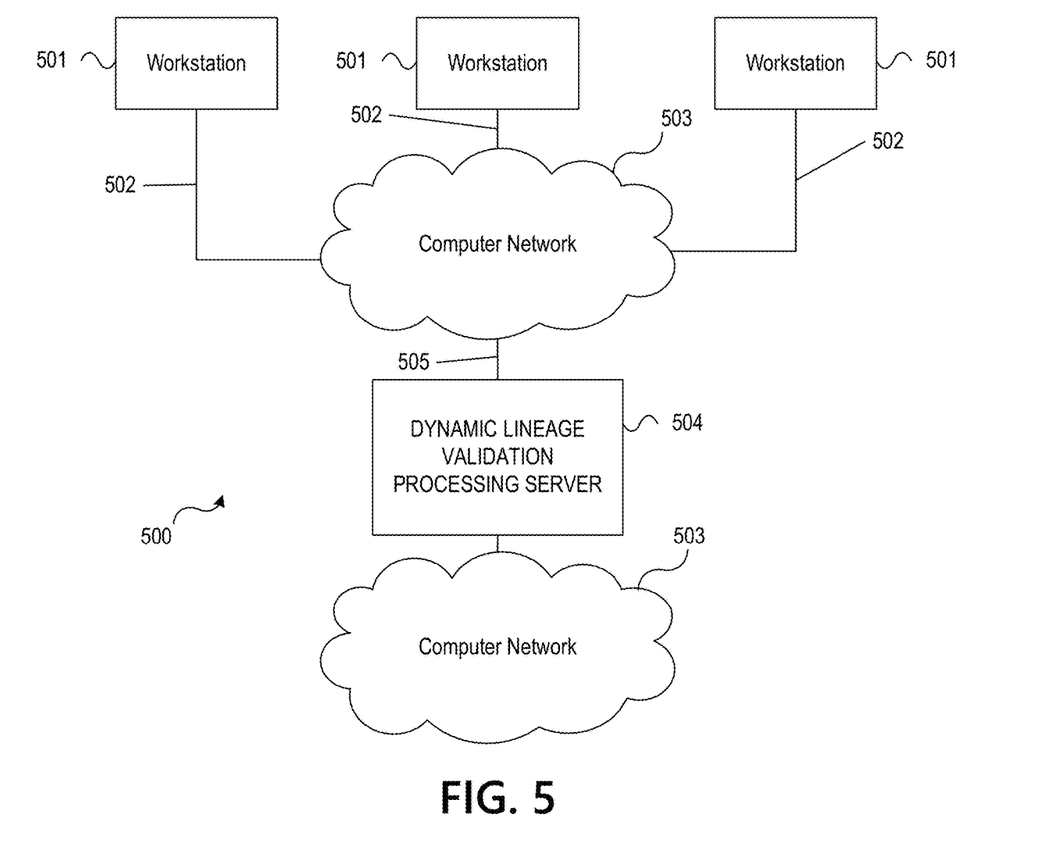
FIG. 5 depicts an illustrative block diagram of workstations and servers that may be used to implement the processes and functions of certain aspects of the present disclosure in accordance with one or more aspects described herein.

FIG. 5 depicts an illustrative block diagram of workstations and servers that may be used to implement the processes and functions of certain aspects of the present disclosure in accordance with one or more example embodiments. Referring to FIG. 5, illustrative system 500 may be used for implementing example embodiments according to the present disclosure. As illustrated, system 500 may include one or more workstation computers 501. Workstation 501 may be, for example, a desktop computer, a smartphone, a wireless device, a tablet computer, a laptop computer, and the like, configured to perform various processes described herein. Workstations 501 may be local or remote, and may be connected by one of communications links 502 to computer network 503 that is linked via communications link 505 to dynamic lineage validation server 504. In system 500, dynamic lineage validation server 504 may be a server, processor, computer, or data processing device, or combination of the same, configured to perform the functions and/or processes described herein. Server 504 may be used to receive mapping documents and/or data, format data, generate libraries, execute a process, collect run time data, link run time data to mapping data, generate an interactive user interface, and the like.

Computer network 503 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 502 and 505 may be communications links suitable for communicating between workstations 501 and dynamic lineage validation server 504, such as network links, dial-up links, wireless links, hardwired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A dynamic lineage validation computing platform, comprising:
   at least one hardware processor;
   a communication interface communicatively coupled to the at least one hardware processor; and
   memory storing computer-readable instructions that, when executed by the at least one hardware processor, cause the dynamic lineage validation computing platform to:
      receive a mapping document including mapping data associated with mapping data source locations to data target locations;
      format the mapping data using a data interchange standard;
      receive a plurality of controls associated with the mapping data;
      execute the plurality of controls;
      determine, based on the executed plurality of controls, whether one or more controls of the plurality of controls has been violated;
      responsive to determining that one or more controls of the plurality of controls have been violated, prevent execution of a process including preventing execution of an application by the processor;
      responsive to determining that one or more controls of the plurality of controls have not been violated, execute, based on the mapping data and the plurality of controls, the process, executing the process including executing the application by the processor;
      after executing the process, monitor the executed process to capture run time event data associated with the executed process;
      link the received run time event data to the mapping data by embedding data into code associated with the process, wherein linking the received run time data to the mapping data includes embedding process version information in the formatted mapping data; and
      validate the mapping data and run time event data based on the linked run time data and the mapping data.

2. The dynamic lineage validation computing platform of claim 1, further including instructions that, when executed, cause the dynamic lineage validation computing platform to:
   generate, based on the formatted mapping data, one or more libraries; and
   store the one or more libraries.

3. The dynamic lineage validation computing platform of claim 1, wherein the plurality of controls includes at least one control including a predetermined acceptable range for a data value.

4. The dynamic lineage validation computing platform of claim 1, wherein linking the received run time data to the mapping data further includes embedding a unique name for at least one step of the process in the formatted mapping data.

5. The dynamic lineage validation computing platform of claim 1, further including instructions that, when executed, cause the dynamic lineage validation computing platform to:
   generate an interactive user interface providing access to at least the mapping data and run time event data.

6. A method, comprising:
   at a computing platform comprising at least one hardware processor, memory, and a communication interface:
      receiving, by the at least one hardware processor and via the communication interface, a mapping document including mapping data associated with mapping data source locations to data target locations;
      formatting, by the at least one hardware processor, the mapping data using a data interchange standard;
      receiving, by the at least one hardware processor, a plurality of controls associated with the mapping data;
      executing, by the at least one hardware processor, the plurality of controls;
      determining, by the at least one hardware processor and based on the executed plurality of controls, whether one or more controls of the plurality of controls has been violated;
      upon determining that one or more controls of the plurality of controls have been violated, prevent execution of a process including preventing execution of an application by the processor;

upon determining that one or more controls of the plurality of controls have not been violated, executing, by the at least one hardware processor and based on the mapping data and the plurality of controls, a process, executing the process including executing an application by the at least one processor;

after executing the process, monitor, by the at least one hardware processor, the executed process to capture run time event data associated with the executed process;

linking, by the at least one hardware processor, the received run time event data to the mapping data by embedding data into code associated with the process, wherein linking the received run time event data to the mapping data includes embedding process version information in the formatted mapping data; and validating, by the at least one hardware processor, the mapping data and run time event data based on the linked run time data and the mapping data.

7. The method of claim 6, further including:

generating, by the at least one hardware processor and based on the formatted mapping data, one or more libraries; and storing the one or more libraries.

8. The method of claim 6, wherein the plurality of controls includes at least one control including a predetermined acceptable range for a data value.

9. The method of claim 6, wherein linking the received run time event data to the mapping data further includes embedding a unique name for at least one step of the process in the formatted mapping data.

10. The method of claim 6, further including:

generating, by the at least one hardware processor, an interactive user interface providing access to at least the mapping data and run time event data.

11. One or more non-transitory computer-readable media storing instructions that, when executed by a computing platform comprising at least one hardware processor, memory, and a communication interface, cause the computing platform to:

receive a mapping document including mapping data associated with mapping data source locations to data target locations;

format the mapping data using a data interchange standard;

receive a plurality of controls associated with the mapping data;

execute the plurality of controls;

determine, based on the executed plurality of controls, whether one or more controls of the plurality of controls has been violated;

responsive to determining that one or more controls of the plurality of controls have been violated, prevent execution of a process including preventing execution of an application by the processor;

responsive to determining that one or more controls of the plurality of controls have not been violated, execute, based on the mapping data and the plurality of controls, a process, executing the process including executing an application by the at least one processor;

after executing the process, monitor the executed process to capture run time event data associated with the executed process;

link the received run time event data to the mapping data by embedding data into code associated with the process, wherein linking the received run time event data to the mapping data includes embedding process version information in the formatted mapping data; and validate the mapping data and run time event data based on the linked run time data and the mapping data.

12. The one or more non-transitory computer-readable media of claim 11, further including instructions that, when executed, cause the computing platform to:

generate, based on the formatted mapping data, one or more libraries; and store the one or more libraries.

13. The one or more non-transitory computer-readable media of claim 11, wherein the plurality of controls includes at least one control including a predetermined acceptable range for a data value.

14. The one or more non-transitory computer-readable media of claim 11, wherein linking received run time event data to the mapping data further includes embedding a unique name for at the least one step of the process in the formatted mapping data.

15. The one or more non-transitory computer-readable media of claim 11, further including instructions that, when executed, cause the computing platform to:

generate an interactive user interface providing access to at least the mapping data and run time event data.

* * * * *

UNITED STATES PATENT AND TRADEMARK OFFICE
CERTIFICATE OF CORRECTION

PATENT NO. : 10,698,884 B2
APPLICATION NO. : 15/804405
DATED : June 30, 2020
INVENTOR(S) : Raman et al.

Page 1 of 1

It is certified that error appears in the above-identified patent and that said Letters Patent is hereby corrected as shown below:

In the Claims

Column 18, Line 30:
In Claim 12, after "and", insert --¶--

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*